United States Patent [19]

Conti et al.

[11] Patent Number: 5,023,741
[45] Date of Patent: Jun. 11, 1991

[54] PROGRAMMABLE LIMITED PLAY VIDEO TAPE CASSETTE

[75] Inventors: Albert B. Conti, Stoneham; Richard G. Egan, Dover, both of Mass.

[73] Assignee: Polaroid Corporation, Cambridge, Mass.

[21] Appl. No.: 263,893

[22] Filed: Oct. 28, 1988

[51] Int. Cl.⁵ ......................... G11B 23/02; G11B 5/03
[52] U.S. Cl. ...................................... 360/132; 360/66
[58] Field of Search ................... 360/132, 60, 66, 118, 360/69

[56] References Cited

U.S. PATENT DOCUMENTS

| | | | |
|---|---|---|---|
| 3,692,956 | 9/1972 | Northrup | 360/60 |
| 3,831,190 | 8/1974 | Ward | 360/66 X |
| 3,995,319 | 11/1976 | Harris | 360/137 |
| 4,338,644 | 7/1982 | Staar | 360/132 |
| 4,466,584 | 8/1984 | Chevalier et al. | 242/199 |
| 4,475,222 | 10/1984 | Egendorf | 377/15 |
| 4,482,104 | 11/1984 | Saito | 242/198 |
| 4,575,778 | 3/1986 | Vogelgesang | 360/132 |
| 4,586,101 | 4/1986 | Vogelgesang | 360/132 |
| 4,593,337 | 6/1986 | Leone et al. | 360/132 X |
| 4,660,115 | 4/1987 | Westfall et al. | 360/132 |
| 4,660,116 | 4/1987 | Westfall et al. | 360/132 |
| 4,702,434 | 10/1987 | Brauer | 242/198 |
| 4,802,212 | 1/1989 | Freeman et al. | 360/60 X |

Primary Examiner—Robert S. Tupper
Assistant Examiner—Andrew L. Sniezek
Attorney, Agent, or Firm—John S. Vale

[57] ABSTRACT

A programmable limited play video tape cassette includes a microcircuit that is programmed to provide a play limit signal at the termination of a selected play period based on time, a calendar period or play count. The cassette also includes selected peripheral devices which render prerecorded picture information on the video tape non-viewable in response to the play limit signal from the programmable microcircuit. In addition to the programmable microcircuit and peripheral devices, the cassette includes a battery, an LCD panel, and one or more sensors.

3 Claims, 4 Drawing Sheets

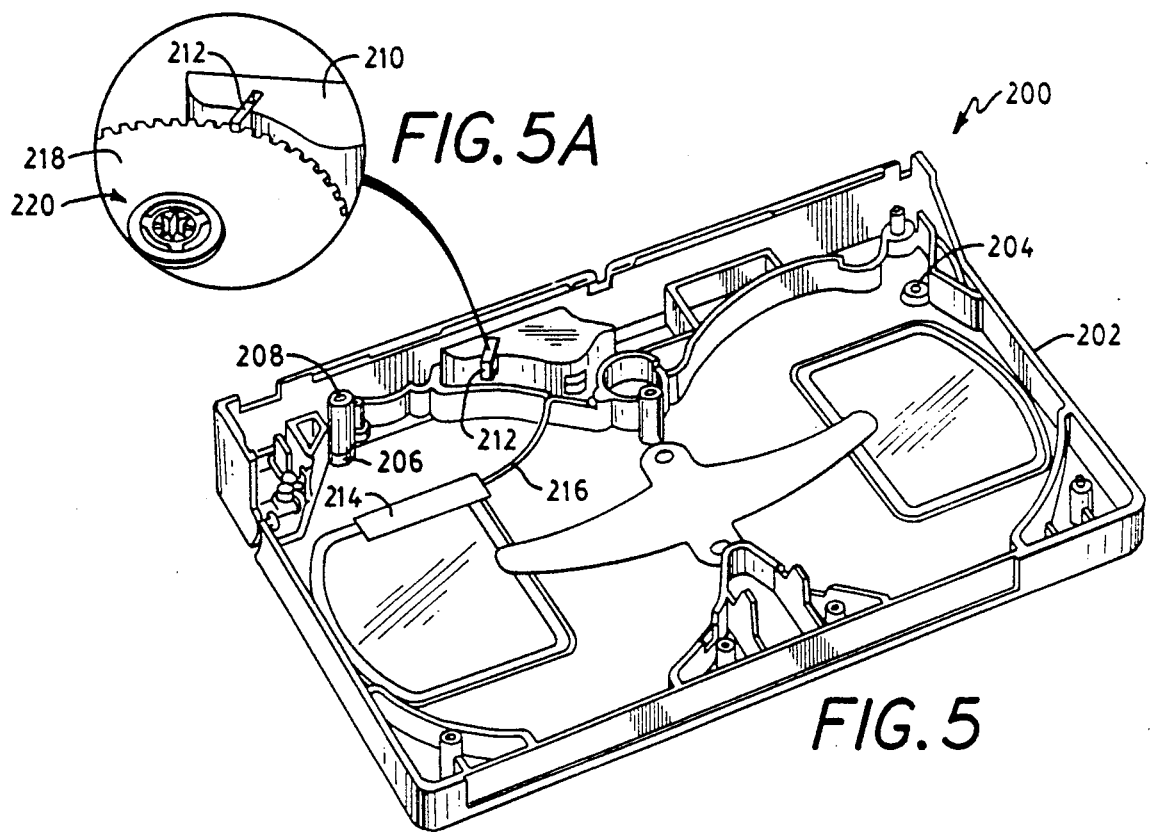
FIG. 5A
FIG. 5
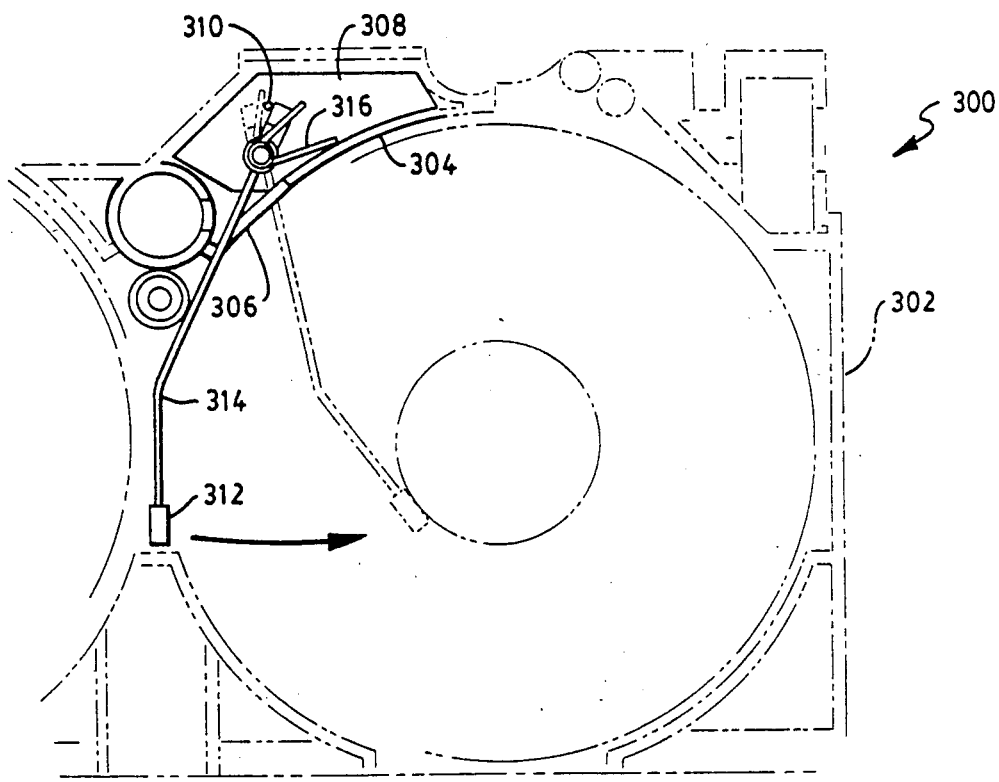
FIG. 6

PROGRAMMABLE LIMITED PLAY VIDEO TAPE CASSETTE

BACKGROUND OF THE INVENTION

This invention relates to limited play video tape cassettes and, more particularly, it concerns a limited play video tape cassette including a programmable microcircuit that can be programmed or reset to limit viewer access on the basis of time, a calendar period, or play count.

Conventional video tape cassettes of copyrighted prerecorded material, such as movies, typically are distributed to consumers by outright sale or by rental on a daily basis. Because such cassette can be played an unlimited number of times and unauthorized copies are easy to make with a home video cassette recorder, the owners of the copyrighted material are seriously inhibited from providing marketing alternatives in terms of pricing, release dates, and a variety of rental options.

Out of an effort to protect copyrighted material marketed through the video cassette rental business, a variety of limited play video cassettes have been devised. For example, U.S. Pat. Nos. 4,660,115 and 4,660,116 to Westfall et al disclose single play video tape cassettes including a tape erasing magnet biased so as to contact the video tape as it is wound around the take-up reel. Thus, as a movie, for example, is being viewed, the prerecorded information on the video tape is erased after it has passed beyond the play head in a video cassette recorder. Other examples of single play video tape cassettes described in U.S. Pat. Nos. 4,482,104 to Saito and 4,702,434 to Brauer incorporate mechanical reel locking mechanisms which prevent rewinding of the tape following a single play. Special equipment is used for resetting the reel locking mechanism and rewinding the tape. The single play tape cassette arrangement of Brauer also includes a counter which displays the number of times that the cassette has been reset.

Such single play video tape cassettes do not allow the viewer to stop the tape, rewind and review any portion of the material on the tape. Further, single play video tape cassettes which can be reset for additional playback require physical inspection of each video tape cassette in order to assure control over the number of times the cassette is played.

Video tape cassettes containing electronic play count monitoring arrangements are disclosed, for example, in U.S. Pat. Nos. 4,475,222 to Egendorf and 4,593,337 to Leone. These arrangements provide for the monitoring of the number of times that the tape is played during a rental period, for example. As such, the rental fee can be based on the number of plays and tape swapping or multiple copying is deterred. These monitoring arrangements keep track of the play count but do not limit the number of times that each cassette can be played. Thus, physical inspection of each video tape cassette is again required for effective control over the protected material.

In addition, a limited play video tape cassette having a mechanical counting and reel locking mechanism which provides for more than a single play is described in U.S. Pat. No. 4,466,584 to Chevalier et al. The locking mechanism prevents rotation of the reels within the video tape cassette after a predetermined number of plays. The locking mechanism can be reset by contacting a reset abutment on a notched locking wheel with a rod or pin. When the locking mechanism of Chevalier et al is reset, it is reset for the total number of plays corresponding to the number of notches on the locking wheel. In order to change the number of times that a particular cassette can be played, the cassette must be dismantled and the notched locking wheel replaced with one having a greater or lesser number of notches.

In light of the foregoing, there is a need for an improved limited play video tape cassette which adopts the construction of a standard video tape cassette, which provides for a different number of limited plays or viewing period depending on the particular marketing scheme desired, which is reprogrammed or reset without disassembly of the cassette, can provide play-count or hours of operation information as needed, and renders the tape non-viewable when tampered with by an unauthorized person.

SUMMARY OF THE INVENTION

In accordance with the present invention, an improved limited play video tape cassette is provided by which a play limit is programmed on the basis of time, a calendar period or play count in a manner facilitating control over the use of video tape cassette and rendering prerecorded picture information on the video tape non-viewable when the play limit has elapsed.

The present invention is embodied in a standard video tape cassette which is modified to include a programmable microcircuit and selected peripheral devices which render prerecorded picture information non-viewable when a programmed play limit has elapsed. The programmable feature provides flexibility for addressing various marketing schemes using a play limit defined on the basis of time, a calendar period, or play count. Each of the programmable limited play video tape cassettes of the present invention preferably includes not only a programmable microcircuit and selected peripheral devices which render the prerecorded picture information inaccessible, but also a power source, a display panel and one or more sensors. The programmable microcircuit, power source, display panel, and sensors are located in customarily unused space or spaces within a standard video tape cassette.

In one preferred embodiment, a standard VHS video tape cassette is modified to include a decryption head, an encryption head, an integrated circuit module, and a display panel. A disruptive code is added along with the prerecorded picture information on the tape so that the picture information is non-viewable unless the decryption head is enabled. In accordance with another embodiment of the present invention, an integrated circuit module contains a resettable reel locking mechanism which prevents rewinding of the tape at the termination of the programmed play period. In accordance with yet another embodiment, an integrated circuit module activates an erase mechanism which destroys the prerecorded picture information at the end of the programmed play period.

Accordingly, a principal object of the present invention is to provide a programmable limited play video tape cassette which allows viewing of prerecorded information for a limited number of plays, period of time, or calendar period after which the prerecorded picture information is rendered non-viewable. Another and more specific object of the invention is the provision of a programmable microcircuit and view limiting components within customarily unused portions of a standard video tape cassette. Yet another object of the present invention is the provision of a limited play video cassette having a programmable unit which may be programmed, reset, or interrogated without disassembly of the cassette.

Other objects and further scope of the applicability of the present invention will become apparent from the detailed description to follow, taken in conjunction with the accompanying drawings wherein like parts are designed by like reference numerals.

BRIEF DESCRIPTION OF THE DRAWINGS

FIG. 5 is a perspective view representing an inverted upper cassette housing section of a programmable limited play video tape cassette in accordance with another embodiment of the present invention;

FIG. 5A is an enlarged perspective view illustrating a portion of the video tape cassette of FIG. 5 together with a portion of a take-up reel; and FIG. 6 is a top plan view representing the bottom cassette housing section of a programmable limited play video cassette in accordance with yet another embodiment of the present invention.

DETAILED DESCRIPTION OF THE PREFERRED EMBODIMENT

Figure 1:
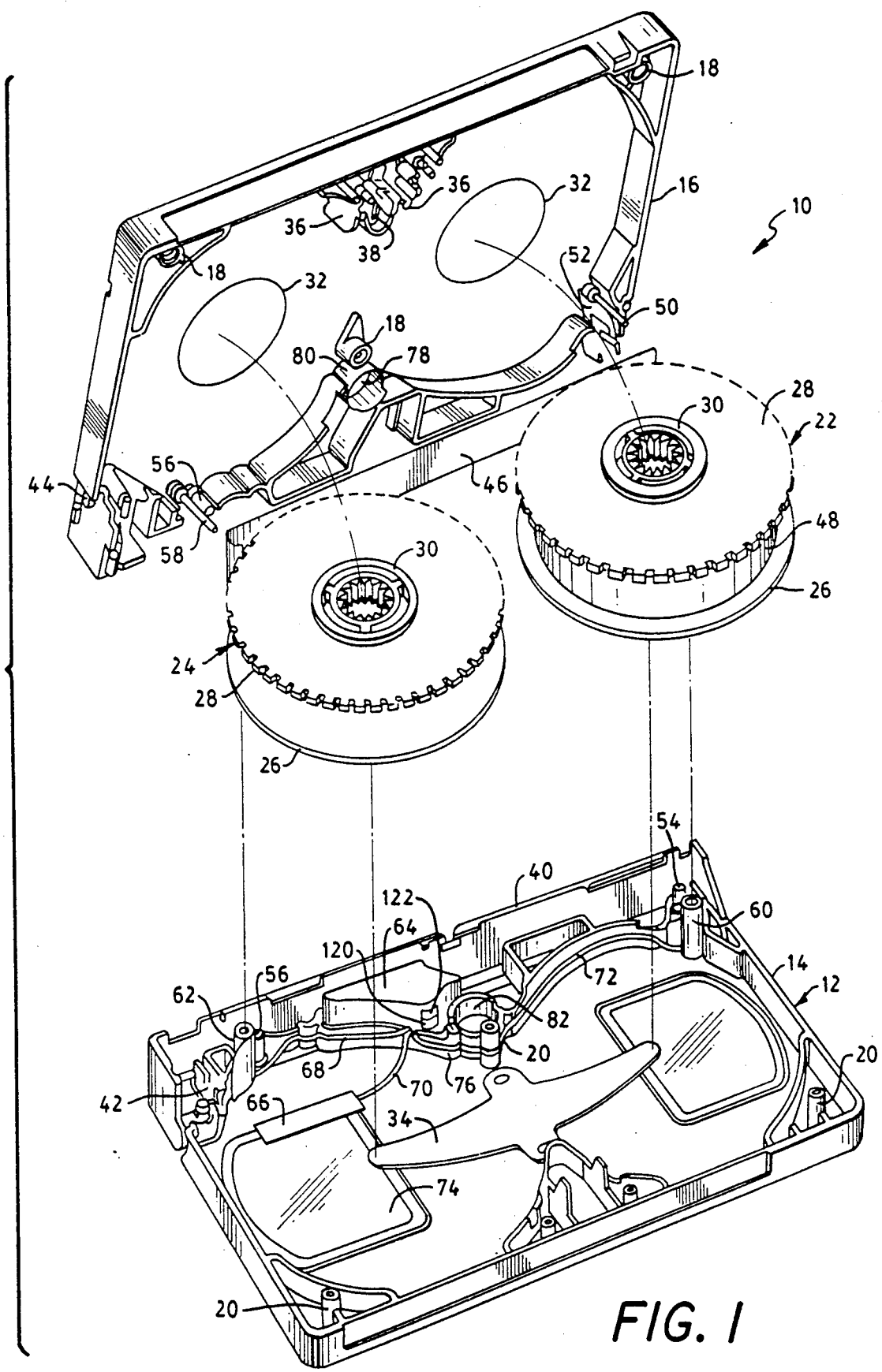
FIG. 1 is an exploded perspective view illustrating an inverted programmable limited play video tape cassette in accordance with one embodiment of the present invention.

In FIG. 1 of the drawings, a programmable limited play VHS video tape cassette in accordance with a preferred embodiment of the present invention is generally designated by the reference numeral 10 and shown to include a conventional cassette housing 12 formed of an upper housing section 14 and a lower housing section 16. For the sake of clarity, the cassette is shown inverted with the upper and lower housing sections 14 and 16 separated. It is to be understood that in use, the housing sections are securely fastened one to another in opposing relation by a plurality of threaded fasteners (not shown). For example, each of three fasteners project through a cylindrical cavity 18 and into a corresponding tubular extension 20 telescopically received within one of the cavities 18. The cassette housing 12 encloses a conventional spool-like tape supply reel 22 and an identical conventional take-up reel 24.

Each reel includes a circular transparent cover 26, a peripherally toothed circular base 28 and a drive hub 30. The portion of each of the drive hubs 30 which extend above the base 28 is received within a circular opening 32 having a larger diameter than the outer diameter of each drive hub to allow for limited lateral movement and rotation of the respective reels. Opposite ends of a spring member 34 mounted on the inner surface of the upper housing section 14 bias each of the reels 22 and 24 toward the lower housing section 16 to ensure that the raised portions of the hubs 30 remain within the openings 32.

A pair of spring biased reel locking pawls 36 are mounted in a conventional manner near the mid portion of the rear wall of the lower housing section 16 in a position to normally extend within one of the peripheral notches in each of the bases 28 and 30. When the cassette 10 is inserted into a VHS video cassette recorder (VCR) a release mechanism 38 is actuated in a conventional manner to pivot the pawls 36 away from the peripheral notches in the bases 28 and free the reels for rotation.

A standard protective tape cover 40 is mounted for pivotal movement to the front surface of the upper cassette housing section 14 and biased to a lower tape covering position shown in FIG. 1 by a torsion spring 42. A conventional latching mechanism 44 located near one end of the lower housing section 16 normally retains the pivotal tape cover 40 in its lower tape covering position. When the cassette 10 is inserted into a VCR, the latching mechanism 44 is depressed and releases the tape cover 40 for pivotal movement to an upper retracted position (not shown) exposing a portion 46 of a video tape 48 which lies outside the confines of the upper and lower housing sections 14 and 16 to the recording and playing mechanisms within the VCR.

The video tape 48 is a standard magnetic tape having transparent leading and trailing end portions and is wound around the supply reel 22 in a manner so that the magnetic recording surface of the tape 48 is directed outwardly. In a conventional VHS video cassette, the leading end portion of the video tape is directed between a post 50 and a tape tension spring member 52 and then around a metal guide roller or sleeve (not shown) supported on a first pair of cylindrical section extensions 54 to a second metal guide roller or sleeve (not shown) supported by a second pair of cylindrical extensions 56, against a plastic roller (not shown) supported by a pin 58 and is attached to the hub 30 of the take-up-reel 24.

In accordance with the embodiment of the present invention shown in FIG. 1, the standard VHS video cassette has been modified to include a decryption head 60 and an encryption head 62. The decryption head 60 is supported and positioned by the pin 50 so that the leading end portion 46 of the tape 48 is directed between the decryption head 60 and the tension leaf spring 52 with the magnetic recording surface of the tape being in contact with the decryption head 60. Likewise, the encryption head 62 is supported by the pin 58 so that the leading end portion 46 of the tape 48 passes around the second metal roller or sleeve and then up against the encryption head 62 with the magnetic recording surface of the tape being in contact with the encryption head 62. Further, the standard VHS video tape cassette has been modified to include an integrated circuit module (IC module) 64, an LCD panel 66 and respective electrical wiring 68, 70 and 72 connecting the IC module 64 to the encryption head 62, LCD 66, and decryption head 60.

The LCD panel 66 is attached to the inner surface of one of the transparent windows 74 in the upper housing section 14 so that the information displayed is viewable through the window. The spring member 34 biases the take-up reel 24 away from the window 74 so that the LCD panel 66 and its associated wiring 70 are accommodated within a space between the upper transparent surface 26 of the take-up reel 24 and the inner surface of the upper housing section 14.

In accordance with the preferred embodiment of the present invention, the tape 46 is encrypted with a disruptive code (FIG. 4) along with the picture information. As will be described in more detail below, the disruptive code renders the prerecorded video information non-viewable until such time as the decryption head 60 erases the disruptive code. The encryption head 62 adds the disruptive code back onto the video tape after the tape has passed by the play and record head within the VCR. In this manner, the prerecorded video information is rendered non-viewable except when the decryption head 60 is enabled by the IC module 64.

The lower housing section 16 includes a conventional circular opening 78 and a cylindrical formation 80 which corresponds with a conventional cylindrical cavity forming formation 82 in the upper housing section 14. Each of the formations 80 and 82 includes opposing rectangular recesses which, together with other recesses and openings in the upper and lower housing sections 14 and 16, form two conventional light paths. When a cassette is loaded in a VCR, these paths allow light from a light source, which protrudes through the opening 78, to pass through the transparent leading and trailing end portions of the tape 48 to respective sensors located on opposite sides of the cassette within the VCR to control the VCR tape drive in a conventional manner. In this regard, the decryption head 60, encryption head 62, IC module 64, and wiring 68, 70 and 72 are designed and located so as not to substantially obstruct the standard light paths within the cassette.

The decryption head 60, encryption head 62, IC module 64, LCD display 66 and wiring 68, 70 and 72 are placed within the upper housing section 14 in the position shown in FIG. 1 during assembly of the video cassette 10. Alternatively, a standard fully assembled VHS video tape cassette is disassembled by removing the plurality of threaded fasteners joining the upper and lower housing sections 14 and 16, the customary plastic roller (not shown) located over the pin 58 is removed, the decryption head 60, encryption head 62, IC module 64, LCD panel 66 and wiring 68, 70 and 72 are inserted, and then the upper and lower housing sections are reunited and securely fastened together using fastening elements which are not easily removed, i.e., one way screws.

Figure 2:
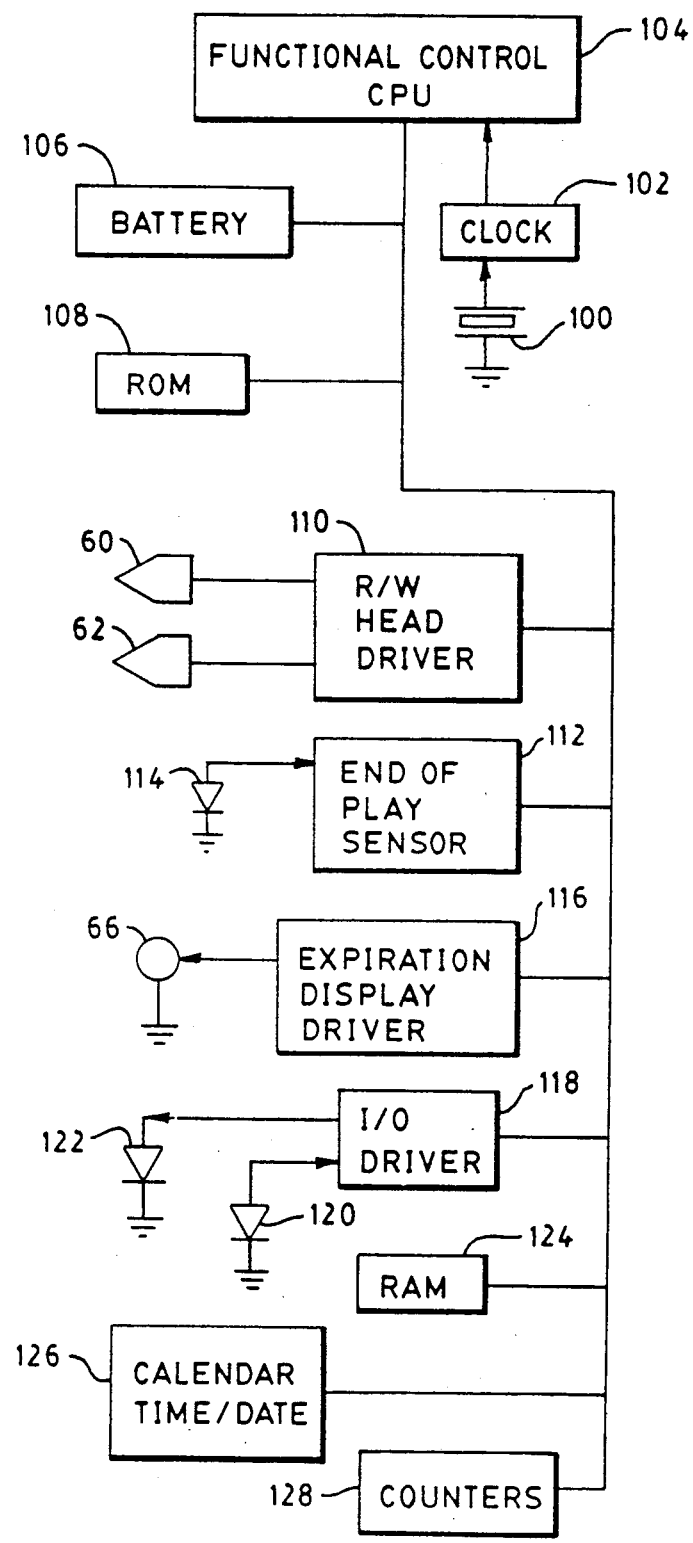
FIG. 2 is a block diagram illustration of an integrated circuit module in accordance with the present invention.

In FIG. 2 of the drawings, components of the IC module 64 are shown in block diagram form to include a crystal oscillator 100 providing sequential pulses to a clock circuit 102 which provides timing signals to a functional control central processing unit (CPU) 104. The CPU 104 is connected to a battery or power source 106, a read only memory (ROM) 108 and a read and write decryption and encryption head driver circuit 110 which controls the decryption and encryption heads 60 and 62 and which is described in more detail with respect to the description of FIG. 3. The CPU 104 is also connected to an end of play sensor circuit 112 which provides an output in response to the output of a sensor 114 such as an optical sensor arrangement which detects the transparent trailing end of the video tape 46 or the decryption head 60 provides a signal indicative of the end of play in response to sensing the transparent trailing end portion or an end of play code pattern on the video tape. Further, the CPU 104 is connected to a play period expiration display panel drive circuit 116 which drives the LCD panel 66 to produce a particular display at the termination of a programmed play period and an in/out programming, resetting, and interrogating signal driver circuit 118 which receives signals from a detector device 120 and provides output to an LED 122. The CPU 104 is also connected to a random access memory (RAM) 124, a calendar time and date circuit 126 and a counter circuit 128.

After the cassette 10 shown in FIG. 1 is fully assembled and a movie or program is recorded on the tape 46 together with a disruptive code (FIG. 4), and the IC module 64 is programmed to set the play limit on the basis of time, for example a predetermined number of hours, a calendar period such as a particular date, or the number of times that the tape is played. Programming is accomplished by inserting an in/out probe (I/O probe) into the opening 78 in the base of the cassette housing 12 to a point where an LED and detector on the I/O probe, similar to the LED 122 and detector 120 in the IC module, are opposite the rectangular opening in the side walls 80 and 82. In this manner, the opening 78, cylindrical formations 80 and 82 and opposing rectangular recesses in these formations form an in/out port (I/O port) which allows for communication with the IC module 64 without requiring disassembly of the cassette 10. As such, provision is made for electro-optical I/O communication between the IC module 64 and the I/O probe which is connected to a PC-like device. The IC module 64 remains in a power-on state as long as the battery 106 is charged.

In order to limit the cost of the IC module while at the same time allowing for the changing of an access password without employing a costly EEPROM, the IC module incorporates a small amount of ROM 108 and has an initial program inputted into the RAM 124. This initializing program enables the IC module to set and verify the password, set the current time, and set the expiration mode. The expiration mode can be selected for operation based on a predetermined duration of time, count of tape plays, or count of transactions, such as the number of 24 or 48 hour periods in which the tape has been played. The initializing program also readies the IC module to set the expiration date, set the initial conditions for display of an expired play period, reset all or any options, and return information on programmed options, battery voltage, tape usage history, etc. Once the initializing program is installed, any future access to the IC module requires the proper password.

The tremendous versatility in the control of proprietary information recorded on each of the programmable limited play video tape cassettes in accordance with the present invention may be understood and appreciated in light of a typical rental cassette marketing scheme. In such a scheme, a "duplicator" is authorized by the owner of the proprietary information to make a predetermined number of authorized copies on video tape cassette. These authorized copies are transferred to a "distributor" who either sells or leases the cassettes to a "rental agent." Ultimately, consumers rent the cassettes from the rental agent. In such a marketing scheme, the duplicator can set up the IC module with both the initializing program and the specific instructions dictating the play limit and manner of utilization. The distributor may be equipped to reprogram or interrogate the cassette with a portable PC-like device and the special I/O probe. Further, the rental agent may be equipped with a similar portable PC-like device and special I/O probe to reset or interrogate the cassette. For example, the duplicator using a password not available to either the distributor or rental agent may program the IC module 64 to provide a play limit at the end of six months. The distributor using a password not known to the rental agent may program the IC module 64 to provide a play limit signal following 100 plays.

The rental agent may interrogate and reset a transaction counter in the IC module 64 following rental of the cassette in order to charge the consumer based on number of plays.

Figure 3:
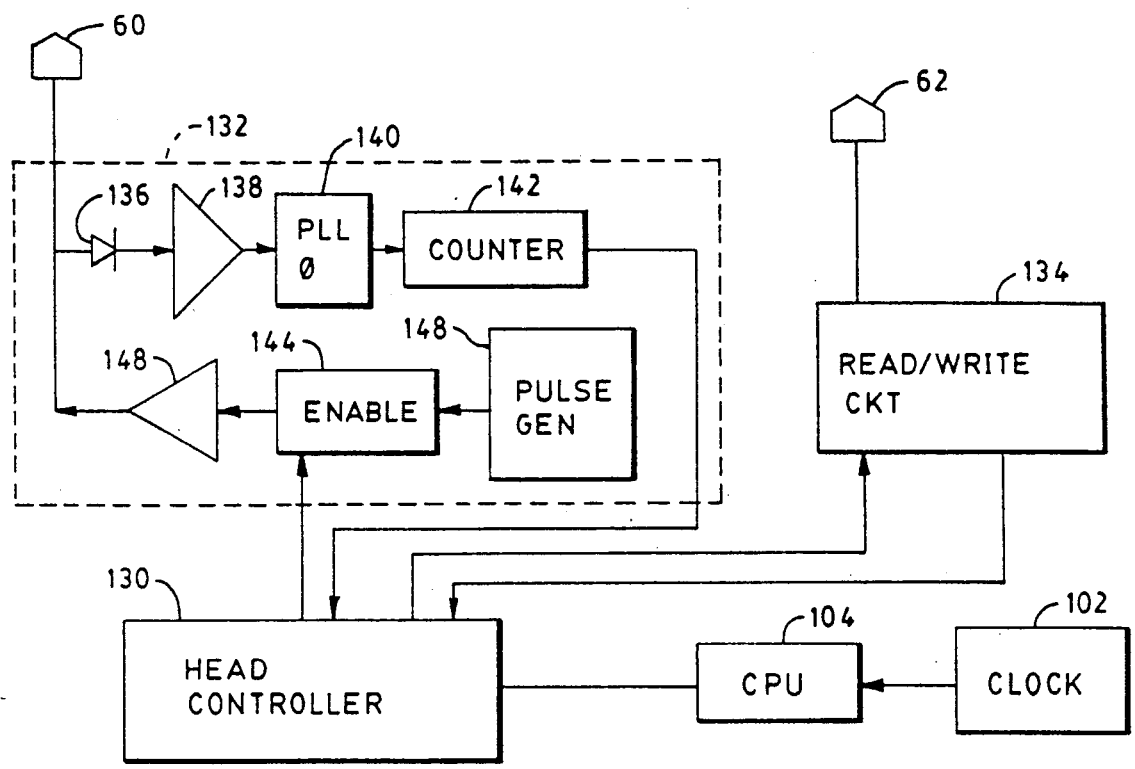
FIG. 3 is a more detailed block diagram representation of the read/write head drive circuit of FIG. 2.

In FIG. 3 of the drawings, components of the read and write decryption and encryption head driver circuit 110 of FIG. 2 are shown in block diagram form to include a head controller circuit 130, a read and erase circuit 132 and a read and write circuit 134. The read and erase circuit-132 is shown in dashed lines to include an amplifier 138, a phase-locked loop circuit 140 and a counter 142 which provides a signal to the head controller circuit 130. An erase enable circuit 144 receives input from a pulse generating circuit 146 and the head controller circuit 140 and provides an output to an amplifier 148.

Figure 4:
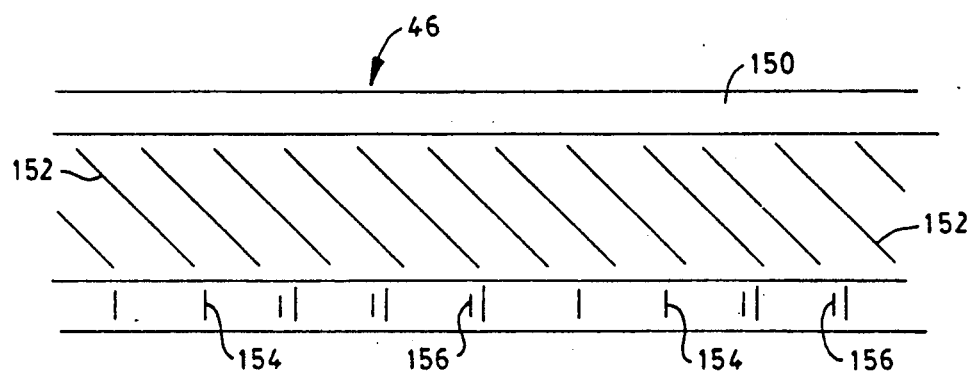
FIG. 4 is a schematic illustration of a section of video tape.

As shown in FIG. 4, the video tape 48 includes an upper audio track 150, a plurality of video tracks 152, and a plurality of lower control tracks 154. The disruptive code placed on the video tape along with the picture information is shown to be a plurality of menacing encryption pulses 156 placed along side the normal 30 Hz control pulses 154. The disruptive code pulses 156 are placed in a random fashion to cause the video drum head servo of a VCR to fall out of sync with the video data on the tape, thereby, and render it non-viewable. In order to render the picture information viewable, the decryption head 60 reads a normal 30 Hz control pulse from the moving tape, then counts down a set delay before activating the head to erase all additional control data up to, but not including, the next normal control pulse 154. This process is successively repeated by the decryption head 60 so that all the disruptive code pulses 156 are removed from the tape 46 before the tape reaches the VCR play head.

After the tape has passed the VCR play head, the encryption head 62 reads a normal 30 Hz control pulse from the tape and counts down a set delay before adding back a menacing encrypting pulse 156 to the tape. Thus, the encryption head 62 restores the tape to its previously encrypted form. If the encryption head 62 is not able to read control pulses 154 from the tape 46 due to tampering, the read and write circuit 134 will provide a signal to the head controller circuit 130 to disable the decryption head 60. With the decryption head 60 disabled, the disruptive code pulses 156 are not erased and the tape is not viewable. Thus, the programmable limited play video tape cassette of FIGS. 1 through 4 is fail-safe.

In accordance with a second embodiment of the present invention, the encryption head 62 is provided with video and audio erase coils which will allow for total tape erasure if and when the programmed instructions call for it. In the second embodiment, the read and write circuit 134 of FIG. 3 would be modified to include an erase circuit similar to that of the read and erase circuit 132. Upon expiration of the programmed play limit, the encryption head video and audio erase coils are activated while the encryption portion of the encryption head is deactivated. As such, the prerecorded picture information is erased and the disruptive code is not added back to the tape. The erased tape can be used as any other blank tape following complete erasure or, for example, returned to the rental agent for credit and reused as a rental cassette.

In FIG. 5 of the drawings, the upper portion of a programmable limited play VHS video tape cassette in accordance with a third embodiment of the present invention is generally designated by the reference numeral 200 and shown to include a conventional upper cassette housing section 202 which is combined with a slightly modified conventional lower cassette housing section to enclose conventional supply and take-up reels, a reel locking mechanism and a video tape as shown in FIG. 1. The upper housing section 202 includes respective integrally molded pin receiving sockets 204 and 206 for receiving the free end of respective pins extending from the slightly modified conventional lower housing section (not shown). A plastic roller 208 is shown resting atop the pin receiving socket 206 in a position to be rotably supported by a pin extending from the lower housing section in a conventional manner.

In addition to the described conventional components, the upper portion 200 of the programmable limited play video cassette includes an IC module 210, a resettable reel locking mechanism 212, an LCD panel 214, and a connecting wire 216. In FIG. 5A, the resettable reel locking mechanism 212 is shown in an extended operative reel locking position with the mechanism placed in one of the peripheral notches in the base 218 of a conventional take-up reel 220. In its operative position, the reel locking mechanism 212 prevents movement of the take-up reel 220 and in so doing renders prerecorded picture information on a video tape (not shown) wound around the take-up reel 220 non-viewable.

The IC module 210 of FIG. 5 differs from the IC module 64 of FIGS. 1 and 2 in that the read and write head driver circuit 110 and the encryption and decryption heads 62 and 60 of the IC module 64 are replaced by a resettable reel lock mechanism driver circuit (not shown) and the locking mechanism 212, respectively. In all other respects, the IC module 210 is the same as the IC module 64 and as such is programmed, reset, and interrogated in the same manner as the IC module 64. The lower housing section (not shown) used with the upper housing section 202 is modified to include a rectangular recess or cut-out which allows the locking mechanism 212 to move into the operative extended position shown in FIG. 5A.

The programmable limited play video tape cassette of FIG. 5 does not include decryption and encryption heads and is not concerned with the application and removal of a disruptive code on the video tape. The prerecorded picture information on the video tape (not shown) used in the programmable limited play video tape cassette 200 is preserved for additional use following reset of the locking mechanism 212 from the operative reel locking position of FIG. 5A to the inoperative position of FIG. 5. The locking mechanism 212 is reset by the IC module 210 in response to a reset code from an I/O probe inserted within the in/out port of the cassette.

In FIG. 6 of the drawings, a lower portion of a programmable limited play VHS video tape cassette in accordance with a fourth embodiment of the present invention is generally designated by the reference numeral 300 and shown in dashed lines to include a conventional lower housing section 302 having an identical construction to the conventional lower cassette housing sections 16 of FIG. 1 with the exception that a portion of an inner wall 304 defining in part the take-up reel cavity of the lower housing section 302 has been removed to form a rectangular recess or cut-out 306. The lower cassette housing section 302 is combined with a conventional upper cassette housing, supply and take-up reels, reel locking pawls and a release mechanism to form a complete video tape cassette.

In addition to the conventional components, the programmable limited play VHS video tape cassette 300 includes an IC module 308, a retractable stop member 310, a magnetic erasing head 312, an elongate lever arm 314, and a biasing torsion spring 316. The video tape cassette 300 does not include encryption or decryption heads and does not require the video tape to be prerecorded with a disruptive code. The IC module 308 limits play of the prerecorded picture information on the video tape of the cassette 300 by erasing the prerecorded information upon expiration of a programmed play period.

In particular, the IC module 308 contains all of the components shown in FIG. 2 except that the read and write head driver circuit 110 and decryption and encryption heads 60 and 62 are replaced by a stop member retraction circuit (not shown) and the stop member 310. The IC module 308 is programmed in the same manner as the IC module 64 to provide a selected play period based upon either time, a calendar period, or play-count and during which the stop member 310 remains in the extended operative stop position shown in FIG. 6. Upon expiration of the programmed play period, the IC module 308 retracts the stop member 310, for example, by energizing a solenoid and allows the elongate lever 314 to swing from the solid line non-erasing position shown in FIG. 6 to the dashed line erasing position shown in FIG. 6 under the force of torsion spring 316. The cut-out 306 accommodates movement of the elongated lever 314. As the tape is wound around the take-up reel, the magnet 312 erases the prerecorded picture information from the video tape and, thereby, renders it non-viewable.

Each of the four above-described embodiments include an IC module seated in a usually empty space within a conventional video tape cassette and contain a microcircuit which is programmed, reset, or interrogated by an external device which includes an optical probe adapted to extend into the cassette through the I/O port.

Thus it will be appreciated that as a result of the present invention, a highly versatile and effective programmable limited play video cassette is provided by which the principal object and others are completely fulfilled. It is contemplated and will be apparent to those skilled in the art from the foregoing description and accompanying drawing illustrations that variations and/or modifications of the disclosed embodiments may be made without departure from the invention. For example, the magnetic head 312 of the fourth embodiment shown in FIG. 6 may be replaced with an alternative mechanism for destroying the prerecorded picture information on the video tape, such as a cutting blade which severs the video tape and thereby destroys the video tape and the prerecorded picture information. Accordingly, it is expressly intended that the foregoing description and accompanying drawings are illustrative of preferred embodiments only, not limiting, and that the true spirit and scope of the present invention be determined by reference to the append claims.

What is claimed is:

1. A limited play video tape cassette of the type including a cassette housing, supply and take up reels, and a video tape having prerecorded program information thereon including video signals for providing viewable and recognizable images when the tape is played and also having encrypted thereon a disruptive code which renders the images non-recognizable unless the disruptive code is removed prior to tape play, said limited play video tape cassette comprising:

programmable control means for providing a play limit signal at the termination of a preselected and programmed play period;

a decryption head, disposed in the cassette housing along the tape's path of travel from the supply reel to an opening in the cassette providing access for tape play, which is normally enabled for removing the disruptive code prior to tape play;

an encryption head, disposed in the cassette housing along the tape's path of travel from the access opening to the take-up reel, for once again encrypting the tape with the disruptive code after tape play; and means, responsive to said play limit signal from said programmable control means, for inhibiting viewing of the video images in recognizable form, said inhibiting means including means for disabling said decryption head so that it does not remove the disruptive code thereby rendering the images non-recognizable when the tape is played.

2. The limited play video tape cassette of claim 1 wherein said inhibiting means further includes means for erasing the program information on the tape.

3. The limited play video tape cassette of claim 2 wherein said erasing means includes video and audio erase coils on said encryption head.

* * * * *